US008453616B2

(12) United States Patent
Eimert

(10) Patent No.: US 8,453,616 B2
(45) Date of Patent: Jun. 4, 2013

(54) VANE-TYPE MOTOR CAM PHASER WITH A FRICTION DISC AND MOUNTING METHOD

(75) Inventor: Jan Eimert, Wolfschlugen (DE)

(73) Assignee: Hilite Germany GmbH, Marktheidenfeld (DE)

( * ) Notice: Subject to any disclaimer, the term of this patent is extended or adjusted under 35 U.S.C. 154(b) by 379 days.

(21) Appl. No.: 12/925,212

(22) Filed: Oct. 15, 2010

(65) Prior Publication Data

US 2011/0094464 A1    Apr. 28, 2011

(30) Foreign Application Priority Data

Oct. 27, 2009   (DE) .................. 10 2009 050 779

(51) Int. Cl.
*F01L 1/34*    (2006.01)

(52) U.S. Cl.
USPC ............... 123/90.17; 123/90.15; 123/90.31

(58) Field of Classification Search
USPC ............................ 123/90.15, 90.17, 90.31
See application file for complete search history.

(56) References Cited

U.S. PATENT DOCUMENTS

| | | |
|---|---|---|
| 699,273 A | 5/1902 | Wolski |
| 894,286 A | 7/1908 | Reineking |
| 1,746,855 A | 2/1930 | French |
| 1,860,163 A | 5/1932 | Wyzenbeek |
| 2,649,105 A | 8/1953 | Stout et al. |
| 2,781,059 A | 2/1957 | Frey |
| 2,918,941 A | 12/1959 | Whiting |
| 3,779,669 A | 12/1973 | Sommer |
| 3,783,590 A | 1/1974 | Allen |
| 3,882,891 A | 5/1975 | Viles et al. |
| 4,051,864 A | 10/1977 | Iwatsuki |
| 4,241,758 A | 12/1980 | Eiermann |
| 4,274,385 A | 6/1981 | Yuzawa et al. |
| 4,787,345 A | 11/1988 | Thoma |
| 4,854,649 A | 8/1989 | Arikawa |
| 5,138,985 A | 8/1992 | Szodfridt et al. |
| 5,323,806 A | 6/1994 | Watari et al. |

(Continued)

FOREIGN PATENT DOCUMENTS

| | | |
|---|---|---|
| DE | 2 025 168 | 12/1971 |
| DE | 2 043 002 | 3/1972 |

(Continued)

OTHER PUBLICATIONS

Smith et al., "A Camshaft Torque-Actuated Vane-Style VCT Phaser", pp. 43-50 (SAE International, Jan. 2005).

(Continued)

*Primary Examiner* — Zelalem Eshete
(74) *Attorney, Agent, or Firm* — Lipsitz & McAllister, LLC

(57) ABSTRACT

The invention relates to a vane-type motor cam phaser with a rotor and a camshaft. Between this rotor and the camshaft, a friction disc is braced axially by means of a central screw. Accordingly, this friction disc transmits a drive torque in a frictionally engaged manner. For pivoting the rotor in two oppositely lying directions of rotation, at least two oil channels (A, B) run through the camshaft and a hub of the rotor. At least the one oil channel (A or B) is sealed hydraulically radially inward by an inner ring part of the friction disc and radially outward by an outer ring part of the friction disc. The inner ring part and the outer ring part are joined to each other by means of a crossarm.

10 Claims, 7 Drawing Sheets

U.S. PATENT DOCUMENTS

| | | | |
|---|---|---|---|
| 5,645,017 | A | 7/1997 | Melchior |
| 5,657,725 | A | 8/1997 | Butterfield |
| 6,024,061 | A | 2/2000 | Adachi et al. |
| 6,035,819 | A | 3/2000 | Nakayoshi et al. |
| 6,053,139 | A | 4/2000 | Eguchi et al. |
| 6,058,897 | A | 5/2000 | Nakayoshi |
| 6,085,708 | A | 7/2000 | Trzmiel et al. |
| 6,209,497 | B1 | 4/2001 | Niethammer et al. |
| 6,234,125 | B1 | 5/2001 | Neubauer et al. |
| 6,267,041 | B1 | 7/2001 | Skiba et al. |
| 6,408,807 | B1 | 6/2002 | Komazawa et al. |
| 6,453,859 | B1 | 9/2002 | Smith et al. |
| 6,532,921 | B2 | 3/2003 | Sato et al. |
| 6,739,297 | B2 | 5/2004 | Palesch et al. |
| 6,814,036 | B2 | 11/2004 | Palesch et al. |
| 6,820,578 | B2 | 11/2004 | Kanada et al. |
| 6,845,740 | B2 | 1/2005 | Kohrs |
| 6,899,126 | B2 | 5/2005 | Weigand et al. |
| 6,941,912 | B2 | 9/2005 | Palesch et al. |
| 6,968,815 | B2 | 11/2005 | Palesch et al. |
| 7,025,023 | B2 * | 4/2006 | Lehmann et al. .......... 123/90.17 |
| 7,121,553 | B2 | 10/2006 | Cornea et al. |
| 7,198,013 | B2 | 4/2007 | Palesch et al. |
| 7,219,636 | B2 | 5/2007 | Sawada |
| 7,240,768 | B2 | 7/2007 | Sageman |
| 7,331,318 | B2 | 2/2008 | Schweizer |
| 7,387,097 | B2 | 6/2008 | Schmitt et al. |
| 7,513,230 | B2 | 4/2009 | Knecht et al. |
| 7,533,695 | B2 | 5/2009 | Strauss et al. |
| 7,584,728 | B2 | 9/2009 | Berndorfer |
| 7,600,531 | B2 | 10/2009 | Patze et al. |
| 7,866,289 | B2 | 1/2011 | Grunow et al. |
| 7,946,266 | B2 | 5/2011 | Knecht et al. |
| 8,225,818 | B1 | 7/2012 | Stephens et al. |
| 2002/0062803 | A1 | 5/2002 | Sato et al. |
| 2002/0088413 | A1 | 7/2002 | Smith et al. |
| 2002/0088417 | A1 | 7/2002 | Palesch et al. |
| 2003/0070713 | A1 | 4/2003 | Cornea et al. |
| 2003/0116110 | A1 | 6/2003 | Kohrs |
| 2003/0177991 | A1 | 9/2003 | Palesch et al. |
| 2004/0112314 | A1 | 6/2004 | Kanada et al. |
| 2004/0211379 | A1 | 10/2004 | Palesch et al. |
| 2004/0244852 | A1 | 12/2004 | Cornea et al. |
| 2005/0051123 | A1 | 3/2005 | Haser et al. |
| 2005/0072397 | A1 | 4/2005 | Sluka et al. |
| 2005/0241603 | A1 | 11/2005 | Palesch et al. |
| 2005/0252561 | A1 | 11/2005 | Strauss et al. |
| 2005/0257762 | A1 | 11/2005 | Sawada |
| 2006/0201463 | A1 | 9/2006 | Schweizer |
| 2006/0225791 | A1 | 10/2006 | Patze et al. |
| 2007/0074687 | A1 | 4/2007 | Bosl-Flierl et al. |
| 2007/0266971 | A1 | 11/2007 | Bosl-Flierl et al. |
| 2008/0115751 | A1 | 5/2008 | Knecht et al. |
| 2008/0149056 | A1 | 6/2008 | Grunow |
| 2008/0149057 | A1 | 6/2008 | Grunow et al. |
| 2009/0020178 | A1 | 1/2009 | Stallmann |
| 2009/0056656 | A1 | 3/2009 | Strauss |
| 2009/0057588 | A1 | 3/2009 | Reilly |
| 2009/0071426 | A1 | 3/2009 | Knecht et al. |
| 2009/0159024 | A1 | 6/2009 | Paul et al. |
| 2009/0159829 | A1 | 6/2009 | Hoppe et al. |
| 2010/0199936 | A1 | 8/2010 | Weiss et al. |
| 2010/0300388 | A1 | 12/2010 | Lang et al. |
| 2011/0162603 | A1 | 7/2011 | Busse |

FOREIGN PATENT DOCUMENTS

| | | |
|---|---|---|
| DE | 36 01 643 | 7/1987 |
| DE | 38 29 698 | 3/1989 |
| DE | 42 10 580 | 10/1993 |
| DE | 42 35 929 | 4/1994 |
| DE | 44 22 742 | 1/1996 |
| DE | 195 25 837 | 1/1997 |
| DE | 199 14 156 | 10/1999 |
| DE | 199 18 910 | 11/1999 |
| DE | 198 23 619 | 12/1999 |
| DE | 198 44 669 | 3/2000 |
| DE | 198 47 705 | 4/2000 |
| DE | 198 53 670 | 5/2000 |
| DE | 199 52 275 | 5/2000 |
| DE | 100 50 225 | 4/2002 |
| DE | 101 58 530 | 8/2002 |
| DE | 101 61 698 | 6/2003 |
| DE | 101 61 701 | 6/2003 |
| DE | 102 05 415 | 8/2003 |
| DE | 102 28 354 | 1/2004 |
| DE | 103 44 816 | 5/2004 |
| DE | 103 30 449 | 2/2005 |
| DE | 103 34 690 | 3/2005 |
| DE | 103 44 916 | 4/2005 |
| DE | 103 46 448 | 6/2005 |
| DE | 10 2004 038 252 | 12/2005 |
| DE | 10 2005 023 056 | 12/2005 |
| DE | 10 2005 001 281 | 1/2006 |
| DE | 10 2004 035 077 | 2/2006 |
| DE | 10 2004 039 800 | 3/2006 |
| DE | 602 07 308 | 3/2006 |
| DE | 10 2005 013 085 | 6/2006 |
| DE | 10 2005 034 275 | 1/2007 |
| DE | 10 2005 034 276 | 1/2007 |
| DE | 10 2006 012 733 | 9/2007 |
| DE | 10 2006 012 775 | 9/2007 |
| DE | 10 2006 036 052 | 2/2008 |
| DE | 10 2007 012 967 | 9/2008 |
| DE | 10 2007 040 017 | 2/2009 |
| DE | 10 2007 041 552 | 3/2009 |
| DE | 10 2007 053 688 | 5/2009 |
| DE | 10 2008 005 277 | 7/2009 |
| DE | 10 2009 035 233.3-13 | 7/2009 |
| DE | 10 2009 022 869 | 12/2010 |
| EP | 0 069 531 | 2/1986 |
| EP | 0 245 791 | 11/1987 |
| EP | 0 388 244 | 9/1990 |
| EP | 0 799 976 | 10/1997 |
| EP | 0 799 977 | 10/1997 |
| EP | 0 821 138 | 1/1998 |
| EP | 0 834 655 | 4/1998 |
| EP | 0 859 130 | 8/1998 |
| EP | 0 896 129 | 2/1999 |
| EP | 0 924 393 | 6/1999 |
| EP | 1 008 729 | 6/2000 |
| EP | 1 197 641 | 4/2002 |
| EP | 1 291 563 | 3/2003 |
| EP | 1 347 154 | 9/2003 |
| EP | 1 447 602 | 8/2004 |
| EP | 1 475 518 | 11/2004 |
| EP | 1 477 636 | 11/2004 |
| EP | 1 703 184 | 9/2006 |
| EP | 2 093 388 | 8/2009 |
| FR | 525481 | 9/1921 |
| FR | 996121 | 12/1951 |
| GB | 1 212 327 | 11/1970 |
| GB | 2 161 583 | 1/1986 |
| JP | 55-72965 | 6/1980 |
| JP | 57-13094 | 1/1982 |
| WO | 99/67537 | 12/1999 |
| WO | 03/078804 | 9/2003 |
| WO | 2004/088094 | 10/2004 |
| WO | 2004/088099 | 10/2004 |
| WO | 2008/140897 | 11/2008 |
| WO | 2010/040617 | 4/2010 |

OTHER PUBLICATIONS

Pohl, Dirk, et al., "Vanecam® FastPhaser-Camphasing System for Improvement of Phasing Rate and Reduction of Oil Consumption", Konfernz Haus der Technik Variable Ventilsteuerung, 17 pages, Feb. 2007.

* cited by examiner

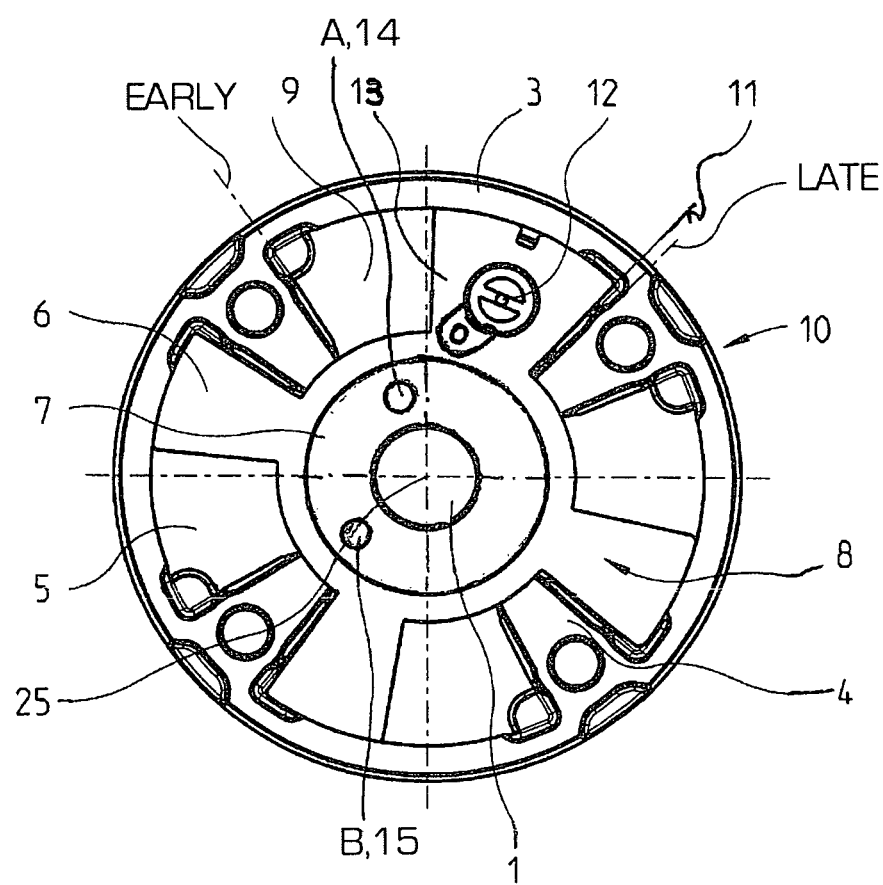

VANE-TYPE MOTOR CAM PHASER WITH A FRICTION DISC AND MOUNTING METHOD

This application claims the benefit of German patent application no. DE 10 2009 050 779.5 filed on Oct. 27, 2009 which is incorporated herein and made a part hereof by reference for all purposes.

BACKGROUND OF THE INVENTION

The present invention relates to a vane-type motor cam phaser with a friction disc. The present invention further relates to a method for mounting such a vane-type motor cam phaser with such a friction disc.

Already known from DE 10 2004 035 077 A1 is a method by means of which a rotor of a vane-type motor cam phaser is fixed in place in an angular position with respect to a camshaft in a stepless and frictionally engaged manner. In this case, the rotor is adjusted so far that any play that may be present in the vane-type motor cam phaser as well as in the drive means is eliminated. Then, in a second mounting step, the vane-type motor cam phaser is joined to the camshaft in a fixed manner by tightening a central screw. In this way, it is possible to align the vane-type motor cam phaser with respect to the camshaft and the crankshaft in a simple and precise manner. Positioning elements are not necessary, so that the cam phaser can be composed of only a few components and, accordingly, can be manufactured at low cost. In this case, the vane-type motor cam phaser is brought into position loosely on the corresponding camshaft. Afterwards, the stepless rotating drive means is applied. Subsequently, the alignment between the camshafts and the vane-type motor cam phasers takes place. A torque wrench is used to adjust the rotor in relation to the stator so as to eliminate any play. Subsequently, the fixed joining of the rotor or of the vane-type motor cam phaser to the camshaft takes place using a hex wrench.

The unpublished DE 10 2009 035 233.3-13 relates to a vane-type motor cam phaser, which exhibits oil channels for conducting oil within the hub of the vane-type motor cam phaser.

SUMMARY OF THE INVENTION

The problem to be solved by the present invention is to create a vane-type motor cam phaser by means of which a high torque can be transmitted to the camshaft.

This problem is solved in accordance with the claimed invention.

Provided to this end in accordance with the present invention is a friction disc. This friction disc is braced between the rotor and the camshaft by means of a central screw. As a result, the central screw increases the frictional torque between the rotor and the camshaft and enables the transmission of a high torque, without the occurrence of slippage. In addition, the high coefficient of friction at surface pairings to the friction disc enables the tightening force of the central screw to be kept relatively small, so that the central hub of the rotor is not deformed so strongly. This prevents a seizing of the rotor, even in the case of narrow clearance fits. As a result, a good efficiency can be achieved. The surface pairing comprises, on the side of the friction disc, a surface with microscopic hard particles, which, in particular, may be silicon carbide or diamond particles. These hard particles form a micro-toothing, which engages the camshaft and the rotor in the microscopic region.

Moreover, it is not absolutely essential to use sealing elements to bridge large reserved tolerances at the components moving with respect to each other—namely, the rotor and stator. Furthermore, it is possible to fabricate the rotor and the central screw from brittle materials—such as thermosetting plastics—or materials with a low tensile strength—such as light metal.

In accordance with an example embodiment of the present invention, the friction disc is made up of an inner ring and an outer ring joined to it via crossarms. In comparison to a two-piece design, the one-piece fabrication of the friction disc has mounting advantages, in particular in terms of positioning.

At least one oil channel runs between the inner ring and the outer ring and supplies the compression chambers of the vane-type motor cam phaser with oil from the side of the camshaft, so that the rotor can pivot hydraulically with respect to the stator. The inner ring and the outer ring thereby seal the oil channel radially toward the outside and inside, so that no pressure loss arises there.

In an example embodiment of the present invention, narrow crossarms enable the friction disc to be positioned arbitrarily in terms of angle, because sufficient oil can always flow past at the narrow crossarms. Accordingly, the feed of oil from the camshaft to the hub of the rotor is ensured.

In a further example embodiment, the invention may be combined with a vane-type motor cam phaser, one oil channel of which passes between the inner ring and outer ring, while the other oil channel passes coaxially within the hub along a central screw. As a result, it is possible to provide an annular groove at the front face of the hub of the rotor. This makes it possible to position and fix in place the rotor in any arbitrary angular position with respect to the camshaft and, in doing so, nonetheless to ensure the transfer of oil from the camshaft to the rotor. The two oil channels then run, namely, coaxially to each other at the point of transfer. In this case, particularly narrow crossarms ensure that a bore provided on the side of the camshaft cannot be covered to such an extent by the friction disc that this results in a crucial influence on the flow. It is also possible to provide a front-face annular groove on the side of the camshaft for angle-independent oil transfer. However, for reasons of operational organization, it is generally advantageous to design only the rotor with a front-face annular groove.

In one example embodiment of the present invention, a retaining device for the friction disc is created, so that an easily mounted component is created.

Further advantages of the invention ensue from the patent claims, the description, and the drawing.

BRIEF DESCRIPTION OF THE DRAWINGS

The present invention will hereinafter be described in conjunction with the appended drawing figures, wherein like reference numerals denote like elements, and:

FIG. 1 shows, in a cut-out illustration, a vane-type motor adjuster with a rotor and a stator.

DETAILED DESCRIPTION

Figure 5:
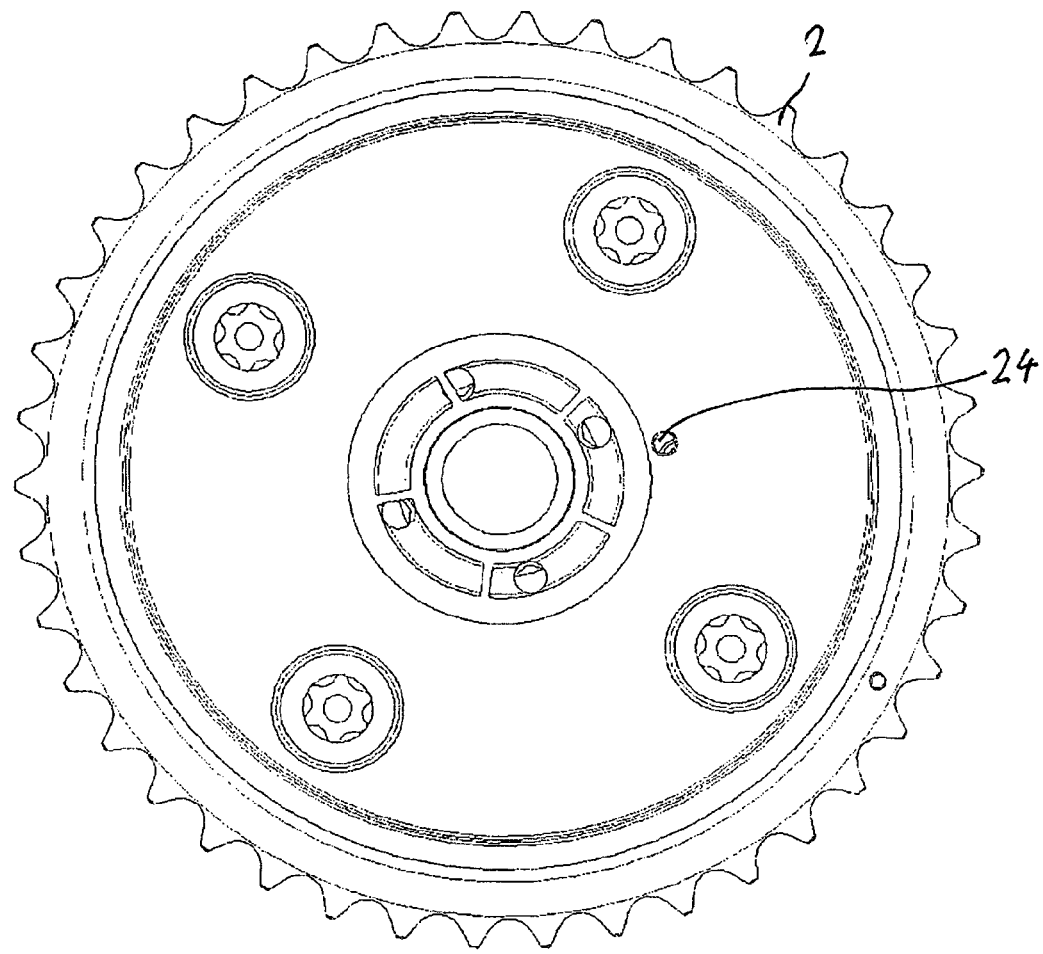
FIG. 5 shows, the closed cam phaser with the friction disc.

A vane-type motor cam phaser, illustrated in FIG. 1, is used to change the angular position between a crankshaft, which is not illustrated in more detail, and a camshaft 1 during the operation of an internal combustion engine drive motor. In so doing, the opening and closing time points of the gas-exchange valves are shifted by turning the camshaft 1 such that the internal combustion engine drive motor affords its optimal power and/or best-possible exhaust emissions at the respective rpm. Here, the vane-type motor cam phaser makes possible a stepless adjustment of the camshaft 1 in relation to the crankshaft. The vane-type motor cam phaser has a cylindrical stator 10, which is joined in a torque-proof manner to the toothed wheel 2, which can be seen in FIG. 5. This toothed wheel 2 can be, for example, a chain wheel, according to FIG. 5, over which is passed a chain, which is not illustrated in more detail. However, the toothed wheel 2 may also be a toothed belt wheel, over which a drive belt is passed as a drive element. Accordingly, this drive, element represents a drive connection between the toothed wheel 2 of the stator 10 and the crankshaft.

The stator 10 comprises a cylindrical stator main body 3, with chamber delimiters 4 projecting radially inward at equal spacings along the circumference on its inner side. Formed between adjacent chamber delimiters 4 are compression spaces 5 into which the pressure medium can be introduced. Projecting between adjacent chamber delimiters 4 are vanes 6, which project radially outward from a cylindrical hub 7 of a rotor 8. These vanes 6 divide each of the compression spaces 5 between the chamber delimiters 4 into two hydraulic compartments, of which only the hydraulic compartments 9 that act in one direction of pivoting can be seen in FIG. 1. The hydraulic compartments assigned to the opposite direction of pivoting are namely reduced to their minimum size, because the vane-type motor cam phaser is illustrated in FIG. 1 in the end position "late." In this end position, one locking vane 13 bearing a locking pin 12 rests with its one contact surface 11 on a small projection of one chamber delimiter 4.

The chamber delimiters 4 lie with their front faces against the outer jacket face of the hub 7 in a sealing manner. The vanes 6, for their part, lie with their front faces against the cylindrical inner wall of the stator main body 3 in a sealing manner.

The rotor 8 is joined to the camshaft 1 in a frictionally engaged and rotation-resistant manner. In order to change the angular, position between the camshaft 1 and the crankshaft, the rotor 8 is pivoted with respect to the stator 10. To this end, depending on the desired direction of pivoting, the pressure medium is pressurized in the first hydraulic compartments 9, while the second hydraulic compartments 9 are relieved of pressure to the tank.

Provided for introducing pressure medium into the compression spaces 5 are oil channels A, B, which are assigned to the two directions of pivoting of the rotor 8.

The oil channel A for imposing pressure in one direction of pivoting runs through a lengthwise bore 14 in the rotor 8. This lengthwise bore 14 is aligned parallel to a central axis 25 of the vane-type motor cam phaser. The lengthwise bore 14 opens in the rotor 8 into a radial bore 22, which leads directly into the compression space assigned to the one direction of pivoting. The lengthwise bore 14 aligns flush to a camshaft bore 23 aligned in the lengthwise direction. For easily mounted manufacture of this flush alignment, a pin may be provided, which is not illustrated in more detail and which, on the one hand, is stuck into a front-face bore of the camshaft 1 and, on the other hand, in a positioning angle bore 24 in the rotor 8, which can be seen in FIG. 4. The pin may be relatively small, so that, in terms of dimensioning, it cannot transmit the camshaft torque under all operating conditions of the internal combustion engine. As a result of the high frictional force at a friction disc 16, which is described further below, the pin is also entirely relieved of camshaft torque. The frictional force of the friction disc 13 thereby relieves the pin not only during transmission of torque in operation, but also when the central screw 29 is tightened.

The camshaft bore 23 leads, via a radial camshaft bore 26, to an annular groove in the camshaft bearing, which is not illustrated in more detail. The pressure medium is fed to this annular groove in the camshaft bearing in a controlled or regulated manner via a valve, which can be constructed in a simple design as a 4/4-way valve or 4/3-way valve.

Figure 3:
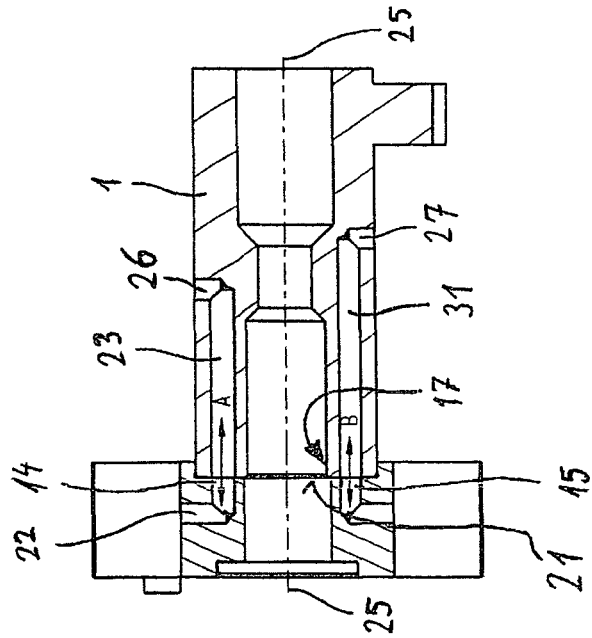
FIG. 3 shows, in a sectional view along the axis of rotation of the rotor, the rotor and a camshaft joined to it via the friction disc.

This valve also leads to the other oil channel B assigned to the other direction of pivoting, which has a basically similar construction. However, this other oil channel B is axially offset in relation to its radial camshaft bore 27 and is arranged in a circumferentially offset manner in relation to the radial bore 28 in the rotor 8. This axial offset enables an additional annular groove for feeding oil to be provided in the camshaft bearing. The circumferential offset of the lengthwise bore 15 in the hub 7 with respect to the lengthwise bore 14 can be seen in FIG. 2. In this case, spanning the area between the two lengthwise bores 14, 15 around the lengthwise axis 25 is an angle, the arms of which are illustrated by dot-dash lines and define the sectional plane of FIG. 3. Somewhat smaller than this angle is an angle $\alpha$, which spans the area in the circumferential direction around the central axis 25 between the edges of the lengthwise bores 14, 15.

Figure 2:
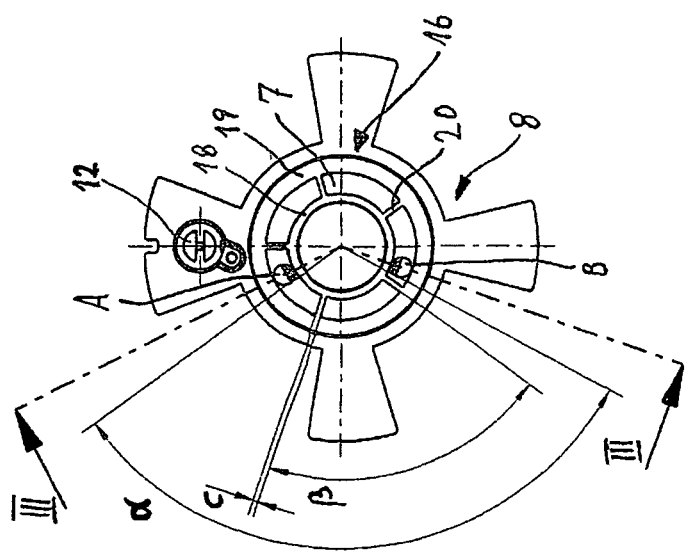
FIG. 2 shows, in an individual-part view, the rotor from FIG. 1, which has a friction disc.
Figure 4:
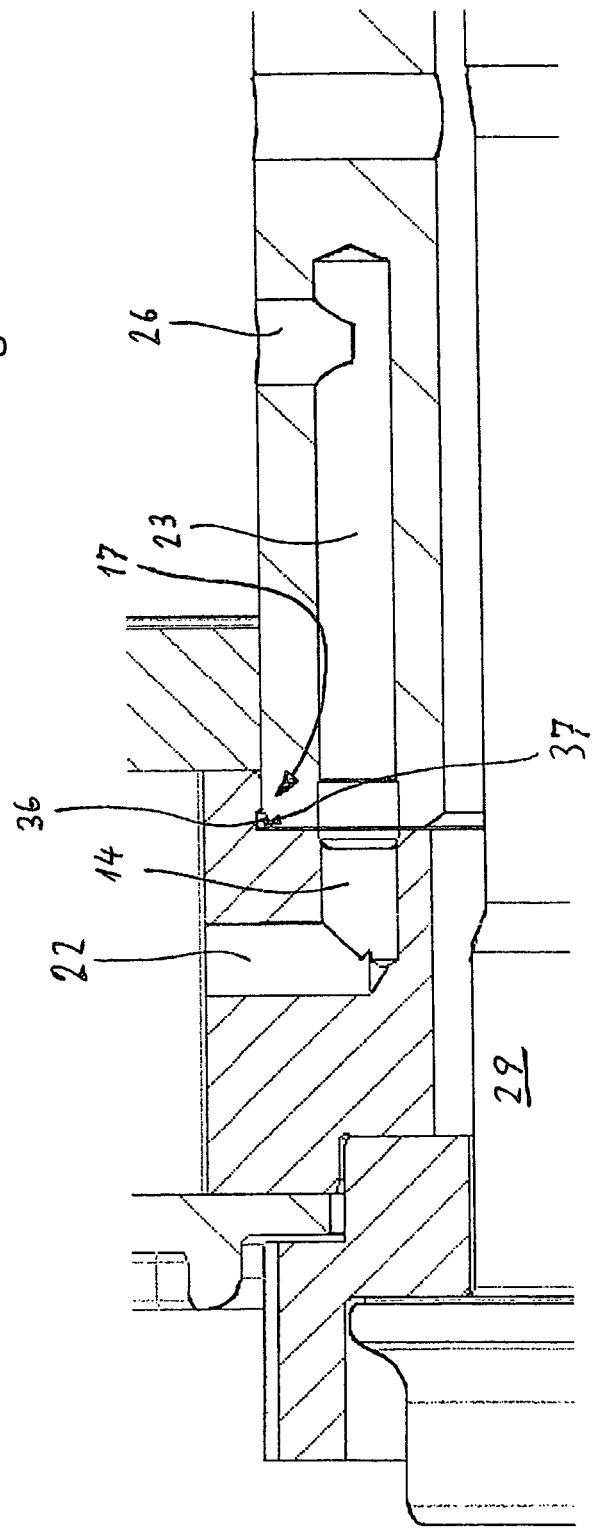
FIG. 4 shows, the sectional view from FIG. 3 in detail, with a central screw being additionally illustrated for axial bracing of the rotor with the camshaft.

It can be seen in FIG. 2, in conjunction with FIG. 4, that the friction disc 16 may be inserted into a depression 17 of the rotor 8. This depression 17 serves to accommodate the camshaft 1, so that the friction disc 16 is braced in the base of this depression 17 between the rotor 8 and a front face 21 of the camshaft 1. This friction disc 16 has an inner ring part 18, which is joined to an outer ring part 19 through five radial crossarms 20, distributed uniformly along the circumference. These crossarms 20 have a width c and span an angle $\beta$ between mutually circumferentially adjacent edges. In this case, this angle $\beta$, plus the width c, is smaller than the angle $\alpha$, which spans the area in the circumferential direction around the central axis 25 between the edges of the lengthwise bores 14, 15. Hence, the following holds: $a > c + \beta$.

The friction disc 16 has a one-piece construction made up of the inner ring part 18, the outer ring part 19, and the crossarms 20. To this end, the friction disc 16 may be a low-cost punched part.

The friction disc 16 may be created with a surface or coating or may be made of a material that has a very high coefficient of friction in surface pairing with the front face 21 of the camshaft 1 and the base of the depression 17. This can be, in particular, a surface coated with diamond particles in a nickel-phosphorus bed. In this case, the diamond particles rise above the nickel-phosphorus bed. A central screw 29, which can be seen in FIG. 4, braces the rotor 8 against the camshaft 1. As a result of the relatively high tightening torque, there results a very high break-away torque, which cannot be overcome during operation of the internal combustion engine, at the junction between the rotor 8 and the camshaft 1.

Analogously to the one oil channel A, the lengthwise aligned camshaft bores 31 assigned to the other oil channel B conduct the pressure medium via the lengthwise bores 15 in the hub 7 and via radial bores 32 into the compression spaces 5 assigned to the other direction of pivoting.

The rotor 8 can be fixed in place with respect to the stator 10 in a form-fitting and rotation-resistant manner. Provided to this end is a locking pin 12, which is aligned parallel to the central axis 25. This locking pin 12 is pretensioned by a small compression spring and can lock in place in a locking position of the rotor 8 with respect to the stator 10 in a receptacle hole of the stator 10, which is not visible in the drawing. In the end position "late," illustrated in FIG. 1, this receptacle hole lies behind one of the vanes 6, which accommodates the locking pin 12.

Figure 6:
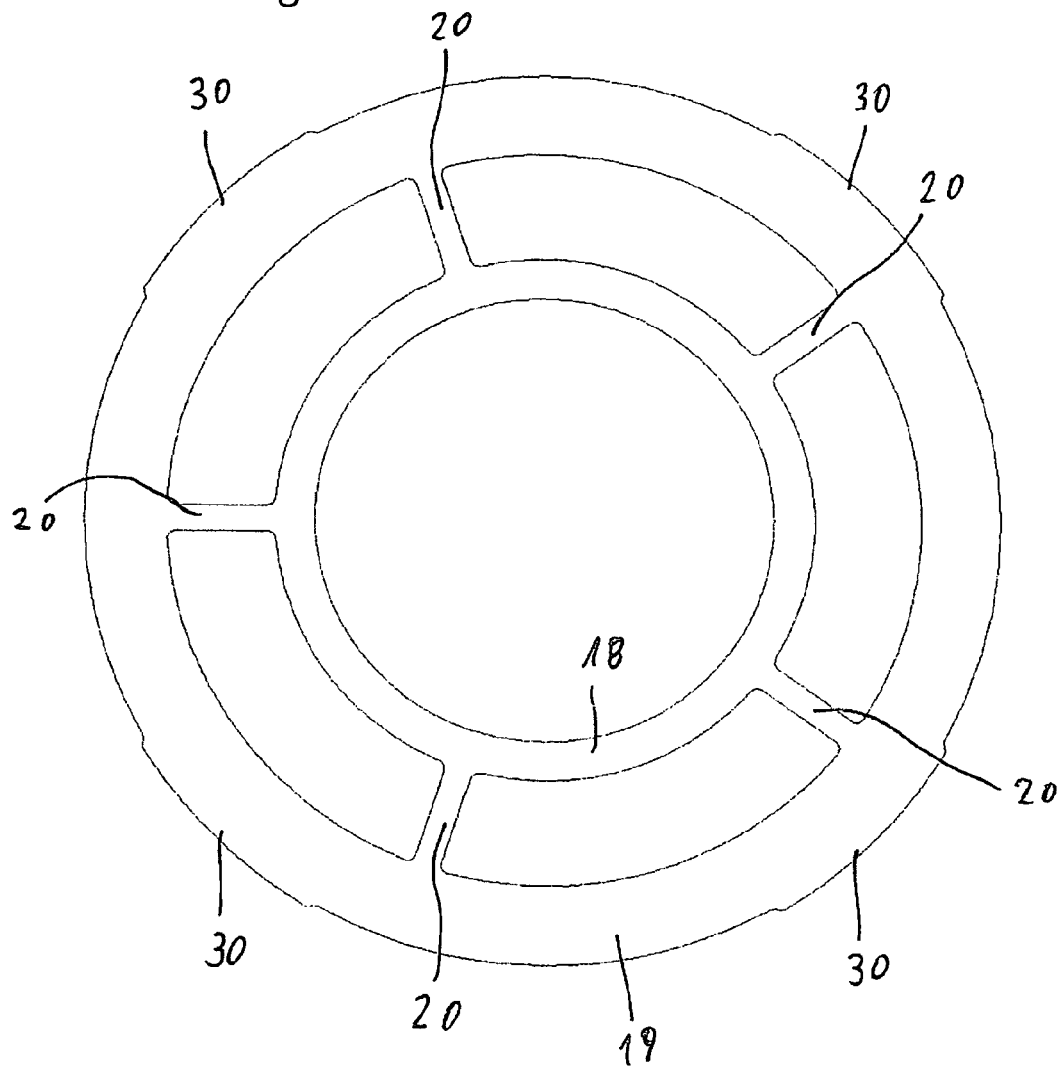
FIG. 6 shows, the friction disc as an individual part.

FIG. 6 shows the friction disc 16 as an individual part. In this case, tabs 30 are distributed along the outer circumference for retention during the mounting of the rotor 8 with the camshaft 1.

It can be seen in FIG. 4 that provided in the depression 17 is a protrusion 37, which accommodates the friction disc 16. A chamfer 36 is provided on the camshaft 1 to facilitate the insertion into this depression.

Figure 7:
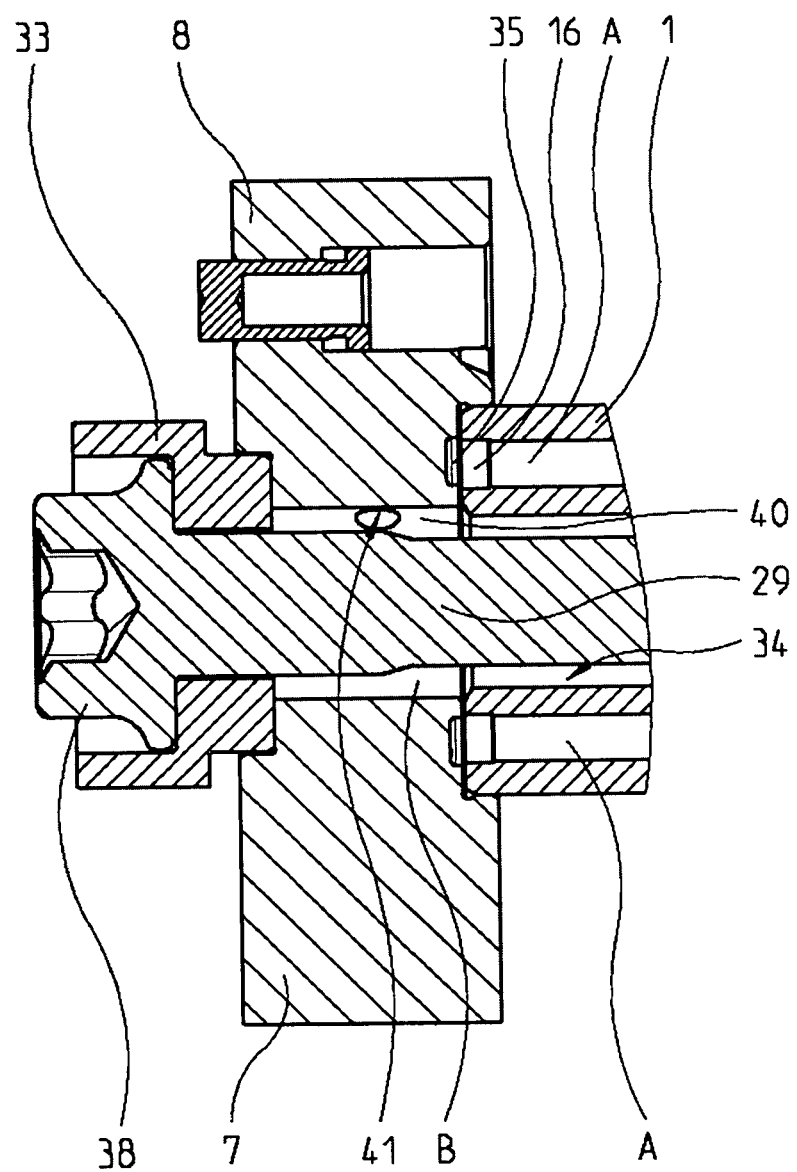
FIG. 7 shows, in a perspective embodiment, another embodiment of the cam phaser.

FIG. 7 shows, in a perspective illustration, another example embodiment of the cam phaser. Analogously to the preceding embodiment, the one oil channel A runs through the camshaft 1. In contrast to the preceding embodiment, the other oil channel B runs through a central recess 40 of the hub 7, through which the central screw 29 is inserted. Branching off before this central recess 40 are radial bores 41, which conduct the oil into the compression compartments 5 assigned to the other direction of pivoting. A ring-shaped counter support 33, braced in a fixed manner between a screw head 38 of the central screw 29 and the hub 7 of the rotor 8 closes this other oil channel B. This ring-shaped counter support 33 is held with a tool during mounting and thus prevents the torque from being transmitted from the screw head support to the rotor. Accordingly, the rotor remains free of torque during mounting. The adjustment of the angle of the rotor with respect to the camshaft is particularly precise.

The counter support 33 can additionally hold a radially inner end of a coil spring, the purpose of which is to hold the rotor 8 in an angular position with respect to the stator. This arrangement of the other oil channel B radially between the central screw 29 and the hub 7 or a camshaft recess 34 makes it possible to pass the one oil channel A, on the side of the hub 7, via an annular groove 35. This annular groove 35 distributes the oil over several bores in the hub 7, which cannot be seen in FIG. 7, to the individual compression compartments. These bores may be constructed, for example, as lengthwise and radial bores.

Provided in analogy to the preceding embodiment according to FIG. 1 to FIG. 6 is a friction disc 16. The circular arrangement of the other oil channel B radially within the oil channel A around the central screw 29 enables the rotor 8 to be positioned and fixed in place in any arbitrary angular position with respect to the camshaft 1 and, in doing so, nonetheless to ensure an oil transfer from the camshaft 1 to the rotor 8. The two oil channels A, B then run, namely, coaxially to each other at the point of transfer. In this case, the friction disc 16 can also be positioned freely in terms of its angular position.

In both embodiments, it is also possible to fit within the hub of the rotor a collar, which is fitted to the aligned recess of the camshaft. In particular, in the second embodiment according to FIG. 7, this collar can be utilized for feeding oil. The collar can, in addition, have a centering function.

The annular groove 35 need not pass around the entire circumference. If a pin is used in order to define the angular position of the rotor with respect to the camshaft for mounting, this pin can interrupt the annular groove 35. In this case, the annular groove is constructed only as a segment of an annular groove.

If the rotor 8 is a sintered part or a cast part, the annular groove 35 can be formed in the rotor already during the original casting process. In comparison, cutting of the annular groove 35 during manufacture is more expensive.

Figure 8:
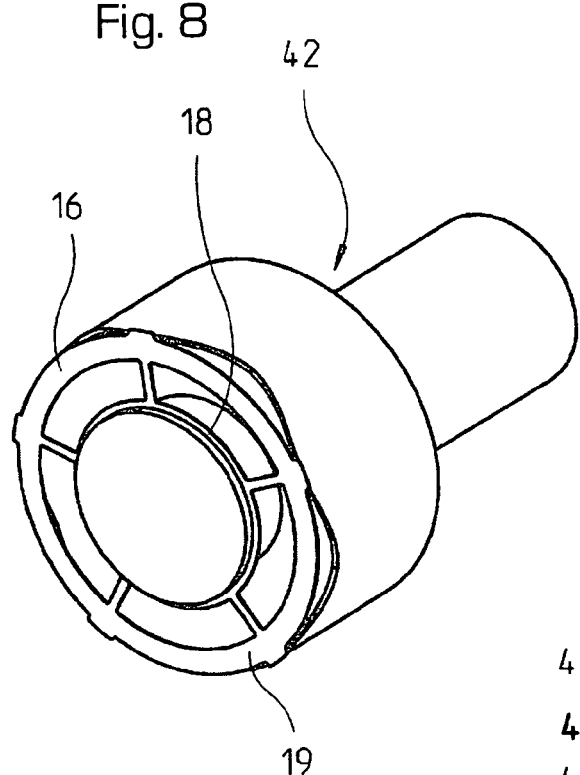
FIG. 8 shows, in a perspective view, a two-part tool, by means of which a friction disc according to FIG. 6 can be inserted into a depression of a rotor according to FIG. 4.
Figure 9:
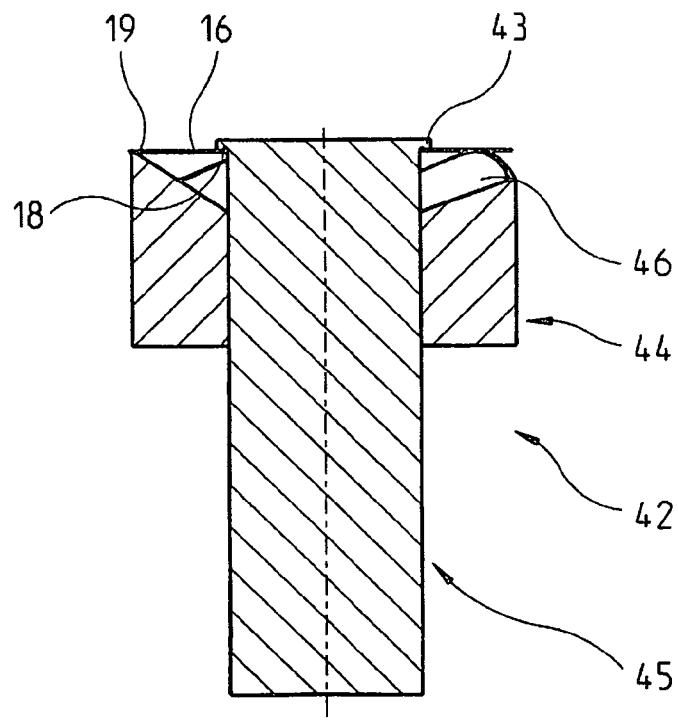
FIG. 9 shows, the two-part tool from FIG. 8 in a cut-out illustration, this tool having a bolt-shaped counter support and a ring-shaped sliding member.

FIG. 8 shows, in a perspective view, a two-part tool 42 by means of which a friction disc 16 according to FIG. 6 can be inserted into a depression of a rotor 8 according to FIG. 4. This tool 42 is part of a pair of pliers, which is not illustrated in more detail. It can be seen in FIG. 9 that this tool 42 has a pliers bolt 45 and a ring-shaped mounting mandrel 44 arranged on it in a sliding manner. In a unclamped state, the inner ring part 18 of the friction disc 16 rests against a shoulder 43 of the pliers bolt 45, whereas the outer ring part 19 rests against corrugations of a corrugated profile of the mounting mandrel 44.

In this case, the mounting mandrel 44 can slide with respect to the pliers bolt 45 in such a way that the shoulder 43 is pulled in the direction pointing toward the mounting mandrel 44. In so doing, the pliers bolt 45 pulls the friction disc 16 into the corrugation depressions of the corrugated profile 46, so that the friction disc 16 is reduced in its outer diameter. In the process, however, the friction disc 16 is not pulled entirely into the base of the corrugation depressions. The greatest outer diameter of the friction disc 16 is then smaller than the inner diameter of the depression 17, illustrated in FIG. 4, in the hub 7 of the rotor 8. As a result, the friction disc 16 can then be inserted into the depression 17 by using the tool 42. Once the friction disc 16 is situated in the base of the depression 17, it can be relieved of tension by sliding the pliers bolt 45 again in the direction pointing away from the sliding part 44. Due to the expansion of the outer diameter of the friction disc 16 that results therefrom, the tabs 30 of the friction disc 16 engage in the ring-shaped protrusion 37. Next, the tool 42 is withdrawn from the depression 17. As a result, the friction disc 16 is secured in the base of the depression 17 in an easily mounted manner, without the friction disc 16 being under tension there.

Figure 10:
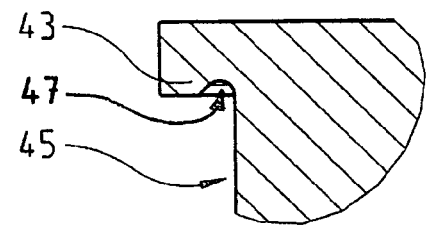
FIG. 10 shows, the counter support in the region of a holder for the friction disc.

The detail according to FIG. 10 shows the pliers bolt 45 in the region of a holder for the friction disc 16. It can be seen here that an undercut 47 is provided at the shoulder 43.

Alternatively, it is also possible to insert into the depression, 17 a friction disc that does not have any tabs 30 on the outer circumference. In this case, it is also possible to use a pair of pliers, the mounting mandrel shaping of which ensures that the friction disc is reduced in diameter in the clamped state.

The embodiments described involve only exemplary embodiments. A combination of the described features for different embodiments is also possible. Further, particularly non-described features of the device parts belonging to the invention may be taken from the geometries of the device parts illustrated in the drawings.

LIST OF REFERENCE NUMBERS

1 Camshaft
2 Toothed wheel
3 Stator main body

4 Chamber delimiter
5 Compression spaces
6 Vane
7 Hub
8 Rotor
9 Hydraulic compartment
10 Stator
11 Contact surface
12 Locking pin
13 Locking vane
14 Lengthwise bore
15 Lengthwise bore
16 Friction disc
17 Depression
18 Inner ring part
19 Outer ring part
20 Arms
21 Front face
22 Radial bore
23 Lengthwise aligned camshaft bore
24 Positioning angle bore
25 Central axis
26 Radial camshaft bore
27 Radial camshaft bore
28 Radial bore
29 Central screw
30 Tabs
31 Lengthwise aligned camshaft bore
32 Radial bore
33 Counter support
34 Camshaft recess
35 Annular groove
36 Chamfer
37 Protrusion
38 Screw head
40 Central recess
41 Radial bores
42 Tool
43 Shoulder
44 Mounting mandrel
45 Pliers bolt
46 Corrugated profile
47 Undercut

What is claimed is:

1. A vane-type motor cam phaser, comprising:
a rotor;
a camshaft;
a friction disc braced axially between the rotor and the camshaft by means of a central screw, the friction disc transmitting a drive torque in a frictionally engaged manner; and
at least two oil channels (A, B) for pivoting the rotor in two oppositely lying directions of rotation, the at least two oil channels (A, B) running through the camshaft and a hub of the rotor,
wherein:
at least one of the at least two one oil channels (A, B) is sealed hydraulically radially inward by an inner ring part of the friction disc and radially outward by an outer ring part of the friction disc, and
the inner ring part and the outer ring part are joined to each other by means of a crossarm.

2. The vane-type motor cam phaser according to claim 1, wherein the other oil channel (B) runs through a central recess (40) of the hub (7), through which the central screw is inserted.

3. The vane-type motor cam phaser according to claim 1, wherein a plurality of radially running crossarms are provided to join the inner ring part to the outer ring part.

4. The vane-type motor cam phaser according to claim 3, wherein:
the other of the at least two oil channels (A, B) is also sealed hydraulically radially inward by the inner ring part and radially outward by the outer ring part; and
an angle $\alpha$ spans an area between positions of oil passages of the oil channels (A, B) through the friction disc that is greater than an area spanned by an angle $\beta$ between edges of the crossarms.

5. The vane-type motor cam phaser according to claim 4, wherein the two oil passages have the same radial spacing to the central axis.

6. The vane-type motor cam phaser according to claim 1, wherein at least one of the oil channels is constructed at least as a segment of an annular groove on a side facing the friction disc.

7. The vane-type motor cam phaser according to claim 6, wherein the annular groove runs around an entire circumference of the hub.

8. The vane-type motor cam phaser according to claim 6, wherein the annular groove is formed by one of sintering or casting during manufacture of the rotor.

9. The vane-type motor cam phaser according to claim 1, wherein for retaining the friction disc during mounting on the rotor, the rotor has a depression with a protrusion into which the friction disc is inserted with axial and radial play.

10. The vane-type motor cam phaser according to claim 9, wherein the friction disc has tabs on an outer circumference, which engage in the depression.

* * * * *